United States Patent
Masuya

(10) Patent No.: US 11,187,910 B2
(45) Date of Patent: Nov. 30, 2021

(54) HEAD-UP DISPLAY DEVICE FOR ADJUSTING DISPLAY DISTANCES OF VIRTUAL IMAGES

(71) Applicant: NIPPON SEIKI CO., LTD., Niigata (JP)

(72) Inventor: Yuki Masuya, Niigata (JP)

(73) Assignee: NIPPON SEIKI CO., LTD., Niigata (JP)

(*) Notice: Subject to any disclaimer, the term of this patent is extended or adjusted under 35 U.S.C. 154(b) by 0 days.

(21) Appl. No.: 16/612,119

(22) PCT Filed: May 15, 2018

(86) PCT No.: PCT/JP2018/018746
§ 371 (c)(1),
(2) Date: Nov. 8, 2019

(87) PCT Pub. No.: WO2018/216553
PCT Pub. Date: Nov. 29, 2018

(65) Prior Publication Data
US 2020/0166762 A1    May 28, 2020

(30) Foreign Application Priority Data

May 22, 2017  (JP) .............................. JP2017-100936

(51) Int. Cl.
*G09G 5/00* (2006.01)
*G02B 27/01* (2006.01)
(Continued)

(52) U.S. Cl.
CPC .......... *G02B 27/0179* (2013.01); *B60K 35/00* (2013.01); *G02B 27/0103* (2013.01);
(Continued)

(58) Field of Classification Search
CPC ............ G02B 27/0179; G02B 27/0103; G02B 27/01; G02B 27/0101; B60K 35/00; G03B 21/142
See application file for complete search history.

(56) References Cited

U.S. PATENT DOCUMENTS 9,933,692 B2    4/2018  Watanabe et al.
2009/0160736 A1*  6/2009  Shikita ............... G02B 27/0101
                                                   345/7
(Continued)

FOREIGN PATENT DOCUMENTS

JP    H9-132055 A      5/1997
JP    2003-335149 A    11/2003
(Continued)

OTHER PUBLICATIONS

International Search Report issued in corresponding International Application No. PCT/JP2018/018746, dated Aug. 21, 2018, with English translation.

*Primary Examiner* — Adam J Snyder
(74) *Attorney, Agent, or Firm* — McDermott Will & Emery LLP

(57) ABSTRACT

The purpose of the present invention is to enable information presented by an additionally displayed virtual image to be displayed in an easily recognizable manner. A projection unit projects, towards a projection-receiving part, display light capable of displaying virtual images in positions having different display distances from a viewer. A display distance determination unit is capable of adjusting, in a depth direction, the display distances of the virtual images displayed by the projection unit. If a display addition determination unit determines that a virtual image is to be additionally displayed, the display distance of an existing virtual image already displayed and the display distance of
(Continued)

a virtual image to be additionally displayed are made to be different.

8 Claims, 7 Drawing Sheets

(51) Int. Cl.
  *B60K 35/00* (2006.01)
  *G03B 21/14* (2006.01)
(52) U.S. Cl.
  CPC .... *G03B 21/142* (2013.01); *B60K 2370/1529* (2019.05); *G02B 27/01* (2013.01); *G02B 27/0101* (2013.01); *G02B 2027/014* (2013.01); *G02B 2027/0185* (2013.01)

(56) References Cited

U.S. PATENT DOCUMENTS

| | | | | |
|---|---|---|---|---|
| 2013/0188259 | A1* | 7/2013 | Nakamura | G02B 27/01 359/630 |
| 2015/0015712 | A1* | 1/2015 | Sempuku | G08G 1/166 348/148 |
| 2016/0124231 | A1* | 5/2016 | Watanabe | B60K 35/00 359/633 |
| 2016/0159280 | A1* | 6/2016 | Takazawa | B60R 1/00 345/8 |
| 2016/0161833 | A1* | 6/2016 | Watanabe | B60R 1/00 345/7 |
| 2016/0167514 | A1* | 6/2016 | Nishizaki | B60K 35/00 345/7 |
| 2016/0170487 | A1* | 6/2016 | Saisho | B60K 35/00 345/156 |
| 2017/0084176 | A1* | 3/2017 | Nakamura | G06K 9/00798 |
| 2018/0350236 | A1* | 12/2018 | Yamaguchi | G02B 27/01 |

FOREIGN PATENT DOCUMENTS

| | | |
|---|---|---|
| JP | 2015-45782 A | 3/2015 |
| JP | 2015-101311 A | 6/2015 |
| WO | 2016051586 A1 | 4/2016 |

\* cited by examiner

[Fig.1]
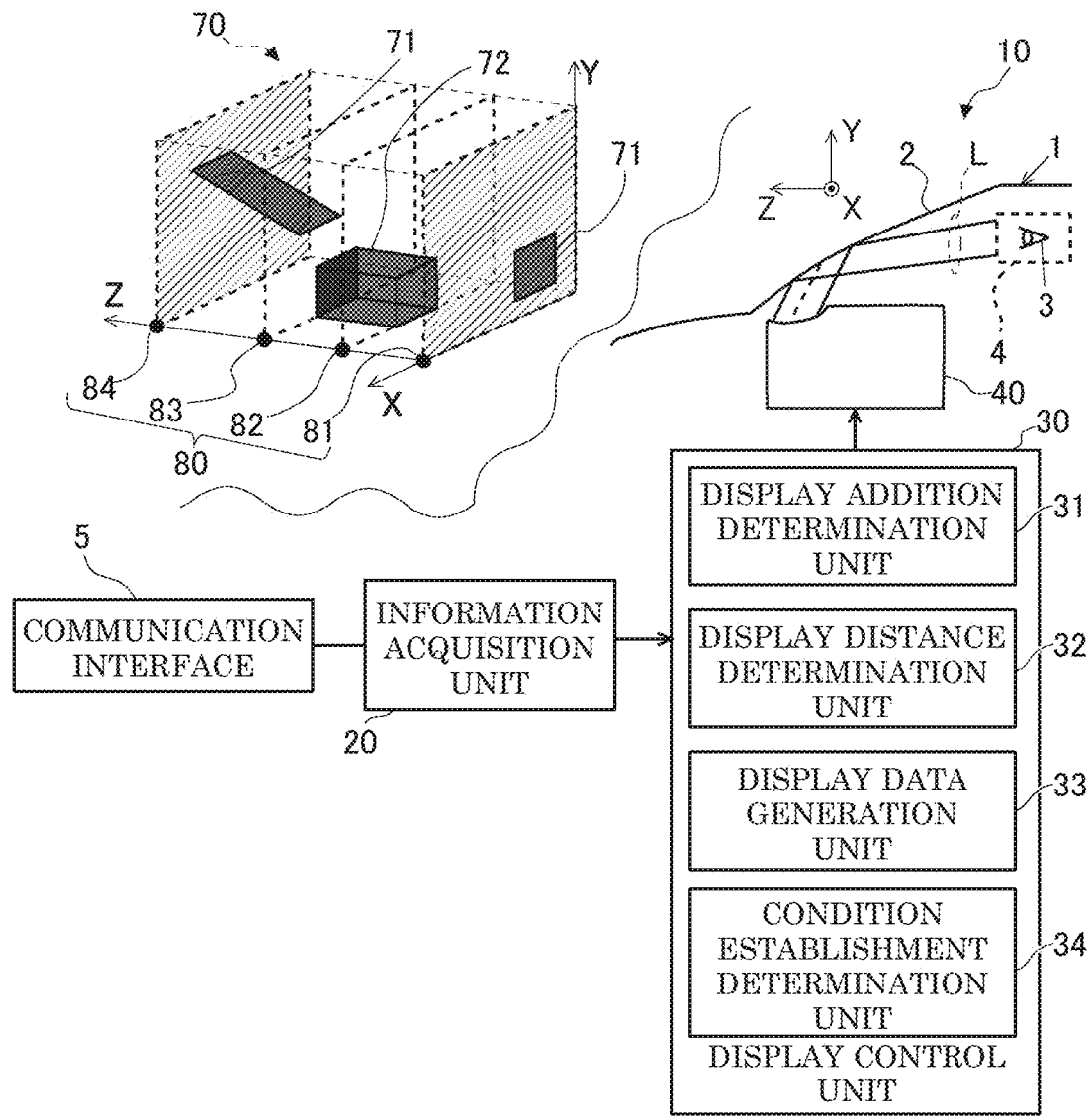

[Fig.2]
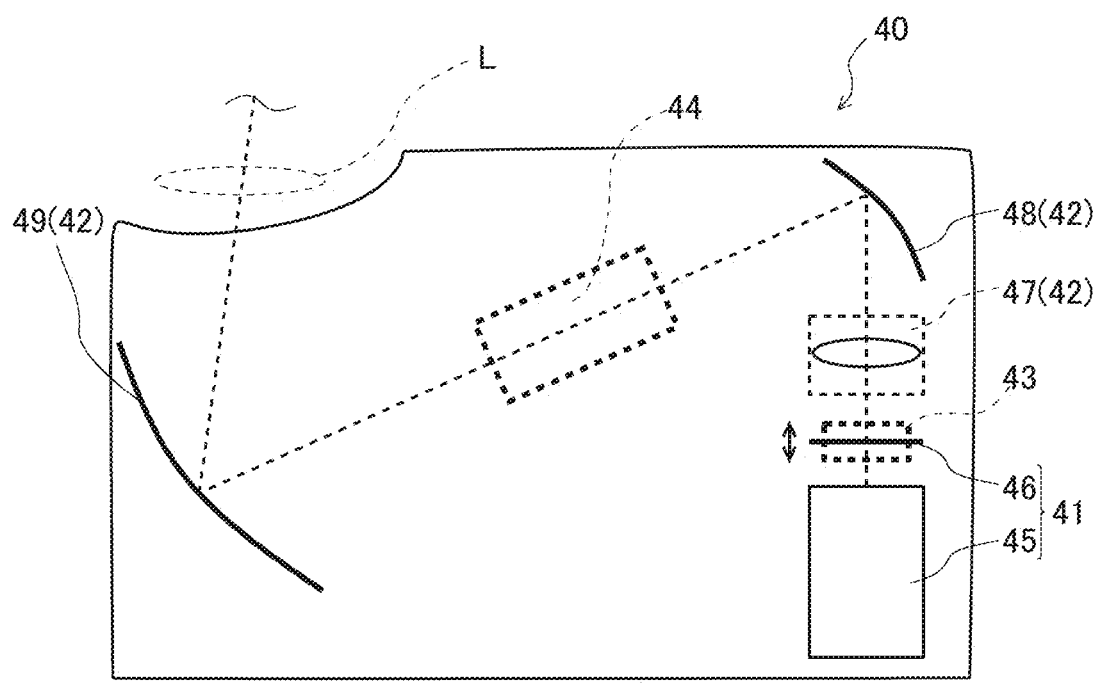

[Fig.3]
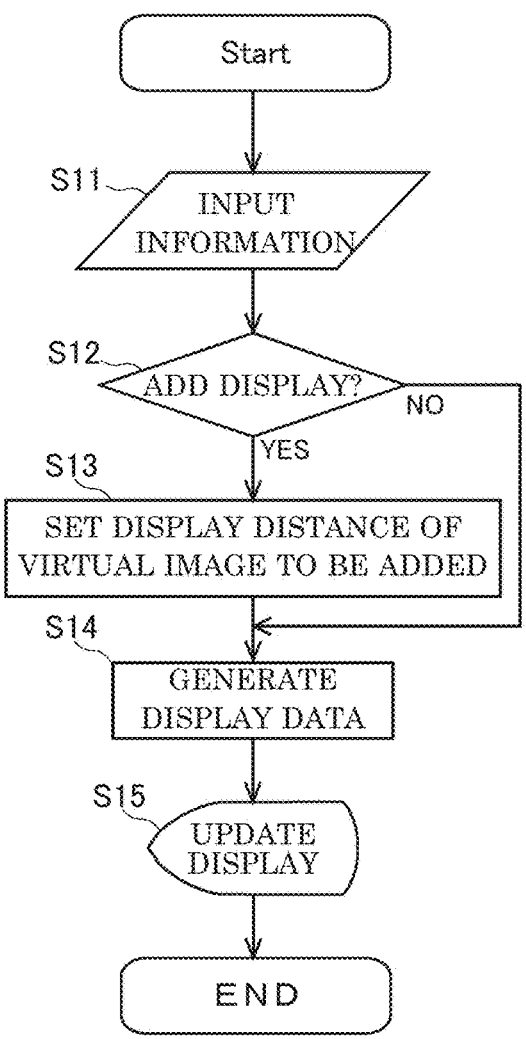
[Fig. 4(a)]
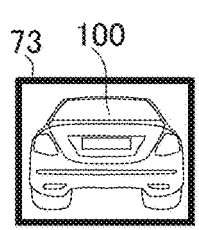
[Fig. 4(b)]
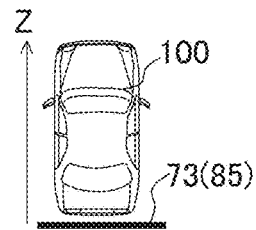
[Fig. 4(c)]
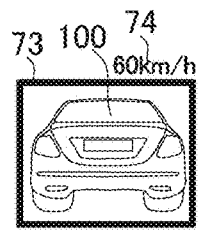
[Fig. 4(d)]
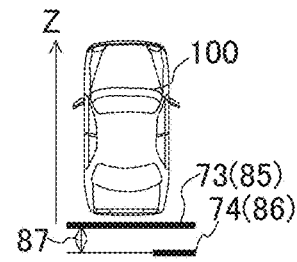

[Fig.5]
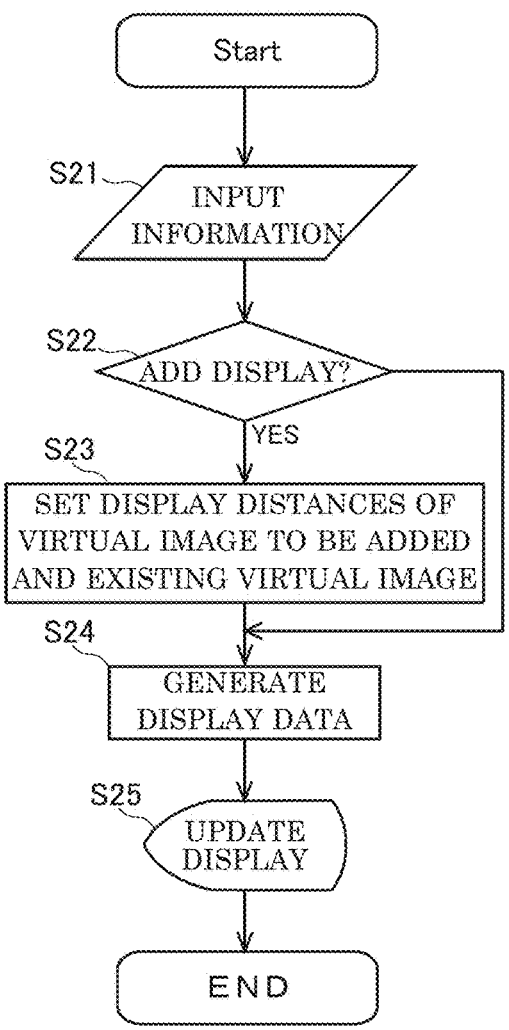
[Fig. 6(a)]
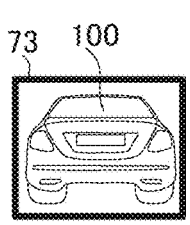
[Fig. 6(b)]
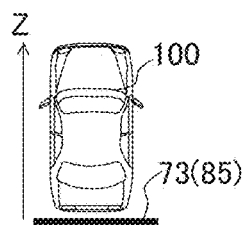
[Fig. 6(c)]
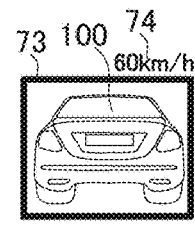
[Fig. 6(d)]
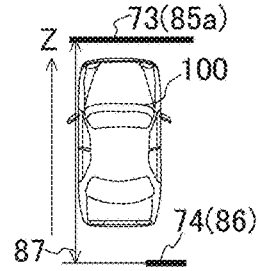

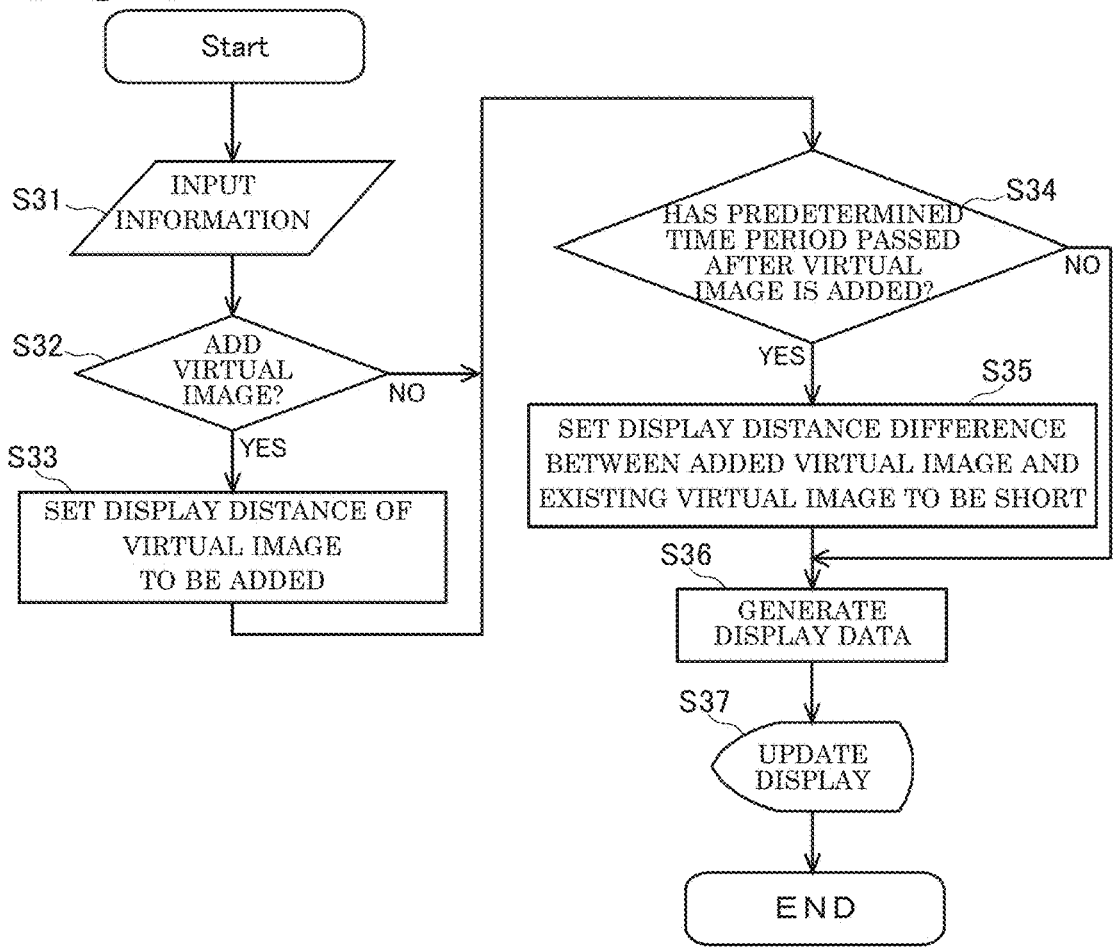

[Fig.9]
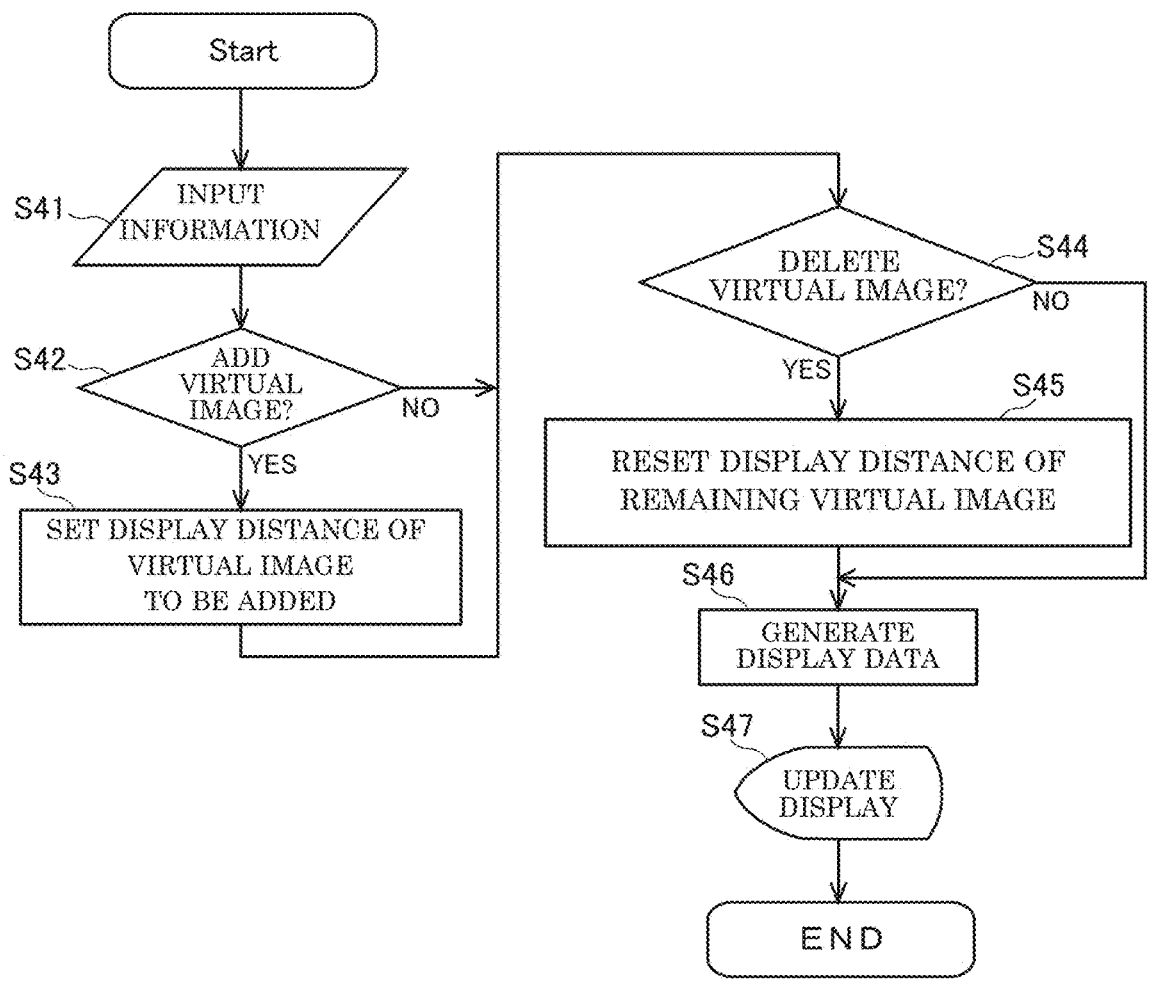
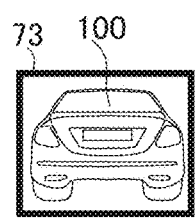
[Fig. 10(a)]
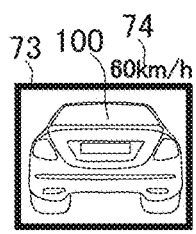
[Fig. 10(c)]
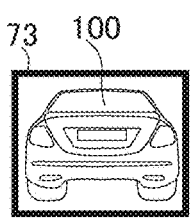
[Fig. 10(e)]
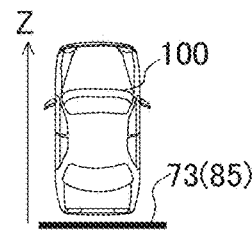
[Fig. 10(b)]
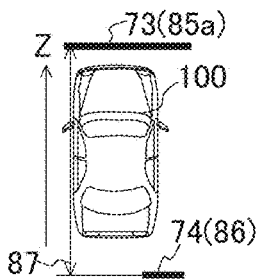
[Fig. 10(d)]
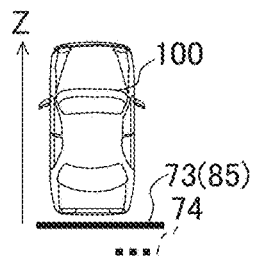
[Fig. 10(f)]

[Fig. 11(a)] [Fig. 11(c)] [Fig. 11(e)]
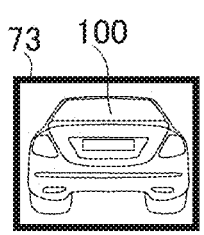
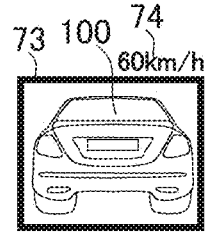
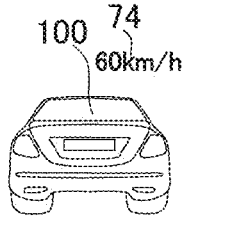
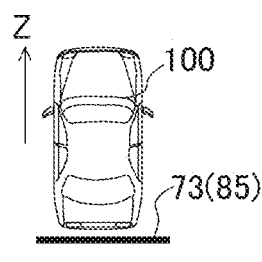
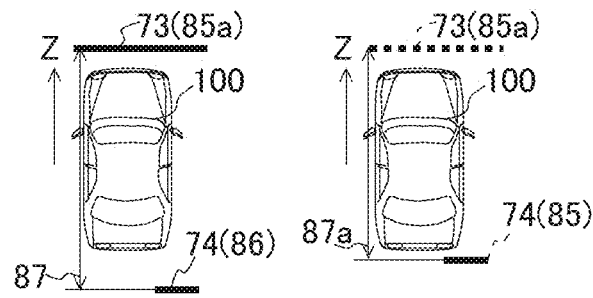
[Fig. 11(b)] [Fig. 11(d)] [Fig. 11(f)]

HEAD-UP DISPLAY DEVICE FOR ADJUSTING DISPLAY DISTANCES OF VIRTUAL IMAGES

CROSS REFERENCE

This application is the U.S. National Phase under 35 U.S.C. § 371 of International Application No. PCT/JP2018/018746, filed on May 15, 2018, which claims the benefit of Japanese Application No. 2017-100936, filed on May 22, 2017, the entire contents of each are hereby incorporated by reference.

TECHNICAL FIELD

The present invention relates to a head-up display (HUD) device to be mounted on a vehicle.

BACKGROUND ART

An HUD device disclosed in Patent Document 1 allows a viewer (generally, a driver of a vehicle) to visually recognize a virtual image to be superimposed on a foreground of the vehicle. As described above, the HUD device displays the virtual image presenting information to the viewer to be superimposed on the foreground so that the viewer can recognize the information indicated by the virtual image without largely shifting a line of sight from the foreground, and therefore, the HUD device can reduce a burden due to movement of the line of sight of the viewer and contribute to safe driving.

PRIOR ART DOCUMENT

Patent Document

Patent Document 1: Japanese Patent Application Publication No. 2015-101311

SUMMARY OF THE INVENTION

Problems to be Solved by the Invention

An HUD device may increase or decrease an amount of information to be transmitted to a viewer even while a vehicle is traveling, according to input information. In other words, a virtual image displayed by an HUD device increases or decreases while a vehicle is traveling. For example, if the viewer happens to stare at a position where a virtual image is added, the viewer can immediately recognize the additionally displayed virtual image, however, if the viewer is not staring at a position where a virtual image is added, even if the viewer can use a peripheral vision to recognize that some kind of virtual image is added, but in order to identify the added virtual image, the viewer needs to move viewer's line of sight to a plurality of virtual images existing in an area where the virtual image is supposed to be added based on the peripheral vision and to consider which virtual image is originally displayed, and as a result, a burden on the viewer to identify the added virtual image is large, and there is a need for solution to be taken.

An object of the present invention is to provide a head-up display device that enables information presented by an additionally displayed virtual image to be displayed in an easily recognizable manner.

Solution to Problem

To solve the above-described problems, the present invention adopts the following means.

A gist of a head-up display device of the present invention is that a display distance being a distance to a virtual image viewed by a viewer can be adjusted, when a display distance of a virtual image to be additionally displayed is differed from a display distance of an already-displayed existing virtual image, the viewer can quickly identify the additionally displayed virtual image, and can easily recognize information presented by the virtual image.

A head-up display device according to a first aspect of the present invention includes:

a projection unit (40) configured to project, towards a projection-receiving part, display light (L) capable of displaying a virtual image (70) in each of positions having different display distances (80) from a viewer;

an information acquisition unit (20) configured to acquire information from outside;

a display addition determination unit (31) configured to determine, based on the information acquired by the information acquisition unit (20), whether to additionally display the virtual image (70); and a display distance determination unit (32) configured to adjust the display distance (80) of the virtual image (70) displayed by the projection unit (40), and to differ a display distance (85) of an already-displayed existing virtual image (73) and a display distance (86) of a virtual image (74) to be additionally displayed if the display addition determination unit (31) determines that the virtual image (70) is to be additionally displayed.

According to the head-up display device thus configured, the virtual image to be additionally displayed and the already-displayed existing virtual image are displayed at different display distances. In other words, the viewer can view the virtual image to be additionally displayed and the already-displayed existing virtual image at positions different in a depth direction (typically, in a front-rear direction of the vehicle). As a result, it is easy to distinguish between the additionally displayed virtual image and the existing virtual image, and if the viewer focuses on one of the virtual images, the viewer does not focus on the other virtual image, and thus, the visibility is lowered. Consequently, a burden imposed on the eyes of the viewer or a burden of recognizing the information presented by the virtual image can be reduced.

Further, as a head-up display device according to a second aspect dependent on the first aspect, the display distance determination unit (32) may change the display distance (85) of the existing virtual image (73) to a different display distance (85a) and determine the display distance (86) of the virtual image (74) to be additionally displayed to be different from the display distance (85a).

In the head-up display device thus configured, when the virtual image is additionally displayed, the existing virtual image is displayed at a display position different from the display distance at which the existing virtual image is originally displayed. Therefore, when the virtual image is additionally displayed, even if the viewer customarily focuses on the display distance at which the existing virtual image is originally displayed, the viewer can not focus on the existing virtual image to be actually displayed. That is, the focus of the viewer's eyes is difficult to momentarily focus on the existing virtual image, and thus, the existing virtual image is less likely to be stared, and the viewer's visual attention is easily directed to the additionally displayed virtual image.

Further, as in a head-up display device according to a third aspect dependent on the first or second aspect, the display distance determination unit (32) may change the display distance (85) of the existing virtual image (73) to a different display distance (85a) and determine the display distance (86) of the virtual image (74) to be additionally displayed to be the same as the display distance (85) of the existing virtual image before being changed.

In the head-up display device thus configured, the display distance of the existing virtual image is changed, and a new virtual image is additionally displayed in accordance with the display distance at which the existing virtual image is originally displayed. Therefore, when the virtual image is additionally displayed, if the viewer customarily focuses on the display distance at which the existing virtual image is originally displayed, the added virtual image is focused instead of the existing virtual image. That is, it is easy to momentarily focus on the additionally displayed virtual image. It is noted that the display distance of the virtual image to be additionally displayed may not necessarily be exactly the same as the display distance at which the existing virtual image is originally displayed, and may be set within 1.5 m before and after the display distance at which the existing virtual image is originally displayed.

Further, as in a head-up display device according to a fourth aspect dependent on the first to third aspects, the display distance determination unit (32) may determine the display distance (86) of the virtual image (74) to be additionally displayed to be shorter than the display distance (85) of the existing virtual image (73).

In the head-up display device thus configured, the added virtual image is visually recognized on the nearer side than the existing virtual image. A virtual image (display) on the farther side when a virtual image (display) on the nearer side is stared at is less likely to direct visual attention (in other words, low attractiveness), as compared to a virtual image (display) on the nearer side when the virtual image (display) on the farther side is started at. Therefore, when the virtual image to be additionally displayed is visually recognized on the nearer side than the existing virtual image, visual attention is less likely directed to the existing virtual image, attention (stare) can be directed to the additionally displayed virtual image, and consequently, the information presented by the additionally displayed virtual image is more easily recognized.

Further, as in a head-up display device according to a fifth aspect dependent on the first to fourth aspects, if a specific condition is established after the virtual image (74) is additionally displayed, the display distance determination unit (32) may shorten a display distance difference (87) between the additionally displayed virtual image (74) and the existing virtual image (73).

If the display distance difference is provided between the existing virtual image and the virtual image to be additionally displayed, when one of the virtual images (displays) is in focus, it is difficult to maintain that the other virtual image (display) is in focus, and thus, it is difficult to recognize the information of the both virtual images simultaneously; however, in the head-up display device according to the fifth aspect, the display distance difference between the existing virtual image and the virtual image to be additionally displayed is shortened, and therefore, as compared to a case where the display distance difference is long, readability of the other virtual image (display) is improved when one of the virtual images (displays) is in focus, and it is easy to simultaneously or quickly recognize the information presented by the both virtual images. For example, when passage of a predetermined time period from the addition of the virtual image is set as the specific condition, immediately after the additional display of the virtual image, a display is provided so that easiness to distinguish between the existing virtual image and the virtual image to be additionally displayed is prioritized, and after the predetermined time period has passed, the display distance difference between the added virtual image and the existing virtual image is shortened. In this way, the information presented by the both virtual images can be quickly recognized.

Further, as in a head-up display device according to a sixth aspect dependent on the fifth aspect, if a specific condition is established after the virtual image (74) is additionally displayed, the display distance determination unit (32) may equalize the display distance (86) of the additionally displayed virtual image (74) and the display distance (85) of the existing virtual image (73).

In the head-up display device according to the sixth aspect, when the display distance difference is eliminated between the existing virtual image and the additionally displayed virtual image, if one of the virtual images (display) is in focus, then the other virtual image (display) is also in focus, and thus, it is easy to simultaneously or quickly recognize the information presented by the both virtual images.

Further, as in a head-up display device according to a seventh aspect dependent on the fifth or sixth aspect, if a specific condition is established after the virtual image (74) is additionally displayed, the display distance determination unit (32) may bring the display distance (101) of the existing virtual image (85) close to the display distance (86) of the additionally displayed virtual image (74).

In the head-up display device thus configured, while the virtual image to be additionally displayed is fixed, the display distance of the existing virtual image is brought close to the display distance of the virtual image to be additionally displayed, and therefore, when while visibility of the additional display is maintained, the display distance difference between the existing virtual image and the virtual image to be additionally displayed is eliminated, if one of the virtual images (display) is in focus, then the other virtual image (display) is also in focus, and thus, it is easy to simultaneously or quickly recognize the information presented by the both virtual images.

Further, as in a head-up display device according to an eighth aspect dependent on the first to seventh aspects, if a condition for hiding either the additionally displayed virtual image (74) or the existing virtual image (73) is established after the virtual image (74) is additionally displayed, the display distance determination unit (32) may bring the display distance (85, 86) of the remaining virtual image (73, 74) close to the display distance (85) of the existing virtual image (73) before the virtual image (74) is additionally displayed.

In the head-up display device thus configured, the display distance of the existing virtual image is changed to be brought close to the display distance at which the virtual image of the additional display is displayed. Therefore, when the additionally displayed virtual image is deleted (hidden), if the viewer customarily focuses on the display distance at which the additionally displayed virtual image is displayed, it is easy to direct visual attention to the existing virtual image near the display distance at which the additionally displayed virtual image is displayed. That is, it is easy to momentarily direct the visual attention to a left virtual image.

BRIEF DESCRIPTION OF THE DRAWINGS

FIG. 1 is a diagram for explaining a configuration of an HUD device according to first to fourth embodiments of the present invention and a virtual image displayed by the HUD device.

FIG. 2 is a diagram illustrating a configuration of a projection unit in the HUD device according to the embodiments.

FIG. 3 is a flowchart illustrating a main operation procedure of the HUD device in the first embodiment of the present invention.

FIG. 4(a) to FIG. 4(d) are diagrams each illustrating a display example of a virtual image displayed by the HUD device according to the first embodiment.

FIG. 5 is a flowchart illustrating a main operation procedure of the Hl. D device in the second embodiment of the present invention.

FIG. 6(a) to FIG. 6(d) are diagrams each illustrating a display example of a virtual image displayed by the HUD device according to the second embodiment.

FIG. 7 is a flowchart illustrating a main operation procedure of the HUD device in the third embodiment of the present invention.

FIG. 8(a) to FIG. 8(f) are diagrams each illustrating a display example of a virtual image displayed by the HUD device according to the third embodiment.

FIG. 9 is a flowchart illustrating a main operation procedure of the HUD device in the fourth embodiment of the present invention.

FIG. 10(a) to FIG. 10(f) are diagrams each illustrating a display example of a virtual image displayed by the HUD device according to the fourth embodiment.

FIG. 11(a) to FIG. 11(f) are diagrams each illustrating a display example of a virtual image displayed by the HUD device according to a modification of the fourth embodiment.

MODE FOR CARRYING OUT THE INVENTION

Embodiments described below are used to facilitate understanding of the present invention and those skilled in the art should note that the present invention is not unduly limited by the embodiments described below.

FIG. 1 is a diagram for explaining a configuration corresponding to each of first to fourth embodiments of a head-up display (hereinafter, also referred to as HUD) device 10 according to the present invention and a virtual image 70 displayed by the HUD device 10. It is noted that in FIG. 1, a front-rear direction of a vehicle 1 is set as a Z direction (the front direction thereof is a positive Z direction), a direction along a left-right direction (a width direction) of the vehicle 1 is set as an X direction (the left direction thereof is a positive X direction), and an up-down direction thereof is set as a Y direction (the upward direction thereof is a positive Y direction).

In FIG. 1, the HUD device 10 according to the present embodiment is communicably connected to a communication interface 5. The communication interface 5 may include a wired communication function such as a USB port, a serial port, a parallel port, an OBD II, and/or any other suitable wired communication port. A data cable from the vehicle 1 is connected to an information acquisition unit 20 of the HUD device 10 via the communication interface 5 to transmit information to the HUD device 10. It is noted that in other embodiments, the communication interface 5 may include a wireless communication interface using such as a Bluetooth (registered trademark) communication protocol, an IEEE 802.11 protocol, an IEEE 802.16 protocol, a shared wireless access protocol, a wireless USB protocol, and/or any other suitable wireless technology.

[Configuration of HUD Device 10]

The HUD device 10 includes the information acquisition unit 20 being an input interface configured to acquire various types of information from the communication interface 5, a display control unit 30, and a projection unit 40 configured to project display light L. For example, the communication interface 5 is connected with a vehicle ECU, a vehicle-mounted camera, a sensor mounted on the vehicle 1, another vehicle-mounted device, a portable device, another vehicle, a communication infrastructure on a road so that information can be received, and the HUD device 10 receives various types of information from the information acquisition unit 20 connected to the communication interface 5 and reflects the information on the virtual image 70 to be displayed.

The HUD device 10 according to the present embodiment projects the display light L toward a projection-receiving part 2 included inside the vehicle 1 and configured to transmit part of the light and reflect part of the light. The projection-receiving part 2 may be configured as a part of a front windshield of the vehicle 1 or may be a dedicated part such as a combiner. An eye box 4 is formed by the display light L reflected by the projection-receiving part 2 in an area where a viewpoint 3 of the viewer is to be placed. The viewer can visually recognize a whole of the virtual image 70 displayed by the HUD device 10 if the viewpoint 3 is placed in the eye box 4, and part of the virtual image 70 cannot be viewed (cannot be easily viewed) if the viewpoint 3 is out of the eye box 4. The HUD device 10 according to the present embodiment can adjust, in the X direction, in the Y direction, and in the Z direction, positions at which the virtual images 71 and 72 are displayed. That is, the HUD device 10 can adjust a display distance 80 being a Z-direction distance particularly from the eye box 4 to where the virtual images 71 and 72 are formed, and display the virtual images 71 and 72 in three dimensions.

The display control unit 30 includes a display addition determination unit 31, a display distance determination unit 32, a display data generation unit 33, and a condition satisfaction determination unit 34. The display control unit 30 generates display data, based on the information acquired from the information acquisition unit 20, and displays the virtual image 70 by driving the projection unit 40, based on the display data. In particular, the display control unit 30 in the present embodiment can adjust the display distance 80 of the virtual image 70 (in particular, each of the virtual images 71 and 72 in the virtual image 70).

The display addition determination unit 31 receives the information acquired from the information acquisition unit 20 via the communication interface 5, and determines whether to add a new virtual image 70 (virtual image 74 to be additionally displayed described later) to the already displayed virtual image 70 (existing virtual image 73 described later). It is noted that the display addition determination unit 31 determines that a condition for adding the new virtual image 70 is satisfied if the information acquisition unit 20 acquires new information, if the acquired information is a predetermined type of information, if the acquired information is information that satisfies a predetermined condition, or if a predetermined combination is established among a plurality of pieces of acquired information, for example.

The display distance determination unit 32 can determine the display distance 80 of the virtual image 70, and if the display addition determination unit 31 determines that the virtual image 70 is to be additionally displayed, the display distance determination unit 32 determines the display distance 80 of each virtual image 70 (see FIG. 4, FIG. 6, FIG. 10, and FIG. 11) so that the display distance 85 of the already displayed existing virtual image 73 is different from the display distance 86 of the virtual image 74 to be additionally displayed. The first to third embodiments for additionally displaying the virtual image 70 and the fourth embodiment for hiding the virtual image 70 will be described in detail later.

The display data generation unit 33 generates display data, and the projection unit 40 is driven based on the display data. The display data includes display distance data for driving the projection unit 40 to display each virtual image 70 at the display distance 80 determined by the display distance determination unit 32.

[Description of Virtual Image]

By using a left-side part of FIG. 1, the virtual image 70 displayed by the HUD device 10 of the present embodiment will be described. The virtual image 70 includes, for example, the 2D virtual image 71 represented in a planar manner and the 3D virtual image 72 represented in a three-dimensional manner. In an example of the 2D virtual image 71, a virtual image is imaged on an XY plane of the display distance 81 of FIG. 1 in a planar manner, and does not allow the viewer to feel a sense of perspective. According to the example of such a 2D virtual image 71, a whole of the display can be clearly recognized without adjusting the focus of the eyes. Further, as another example of the 2D virtual image 71, there is a virtual image of which one end is on the XY plane of the display distance 83 of FIG. 1 and the other end is on the XY plane of the display distance 84 farther apart from the viewer relative to the display distance 83, and this virtual image is formed in a planar manner and allows the viewer to feel a sense of perspective. Such an alternative 2D virtual image 71 can give a three-dimensional impression because the whole of the display is clearly recognized by adjusting the focus of the viewer's eyes. As an example of the 3D virtual image 72, there is a virtual image of which one end is on the XY plane of the display distance 82 of FIG. 1 and the other end is on the XY plane of the display distance 83 farther apart from the viewer relative to the display distance 82, and this virtual image is formed as a three-dimensional object having a volume and allows the viewer to feel a three-dimensional effect. It is noted that in the HUD device 10 of the present invention, the display distance of the virtual image to be additionally displayed is differed from the display distance of the already-displayed existing virtual image. If to lengthen the display distance 80 is expressed in other words, then it can be said to form the virtual image 70 at a position further away from the eye box 4, and for example, this means that the 2D virtual image 71 displayed at the display distance 81 and the 3D virtual image 72 displayed between the display distance 82 and the display distance 83 are brought close to the display distance 84 which is at a far side. Further, if to shorten the display distance 80 is expressed in other words, then it can be said to form the virtual image 70 at a position possibly closer to the eye box 4, and for example, this means that the 2D virtual image 71 displayed at the display distance 84 and the 3D virtual image 72 displayed between the display distance 82 and the display distance 83 are brought close to the display distance 81 which is at a near side.

Example of Configuration of Projection Unit 40

Next, the description proceeds with reference to FIG. 2. FIG. 2 is a diagram illustrating an example of a configuration of the projection unit 40 of FIG. 1. The projection unit 40 of the present embodiment includes a stereoscopic image display unit 41 and relay optical units 42, and the stereoscopic image display unit 41 forms a first 3D real image 43, the relay optical units 42 magnify the first 3D real image 43 to form a second 3D real image 44 and project the display light L of the second 3D real image 44 toward the external projection-receiving part 2.

The stereoscopic image display unit 41 of FIG. 2 is to generate the first 3D real image 43 formed in three dimensions, and includes an image projection unit 45 and a vibration screen 46.

The image projection unit 45 is a projector configured to emit video light (not illustrated) representing a video included in the display data based on the display data input from the display control unit 30, adjusts a timing for displaying the video, according to the display distance data included in the display data, and switches the video at high speed in synchronization with a vibration position of the vibration screen 46. In other words, based on the display distance data, the image projection unit 45 projects the video suitable for the vibration position of the vibration screen 46, onto the vibration screen 46.

The vibration screen 46 is, for example, a diffusion film made of polycarbonate for diffusing the video of the image projection unit 45 into a certain angle range, receives the video light from the image projection unit 45 to form a real image, and reciprocates along an optical axis of the video light emitted from the image projection unit 45. The vibration screen 46 can continuously or intermittently transmit a signal indicating the vibration position to the image projection unit 45, and the image projection unit 45 may adjust the timing for displaying the video, based on the signal indicating the vibration position, so that the virtual image 70 is visually recognized at a position in accordance with the display distance data included in the display data.

In the present embodiment, the display control unit 30 adjusts a length in a depth direction Z of the virtual image 70 while keeping constant an amplitude of the vibration screen 46 in a screen vibration direction. That is, the display control unit 30 does not emit the display light L in a period during which the vibration screen 46 is positioned in a first range of the amplitude, and emits the display light L in a period during which the vibration screen 46 is positioned in a second range of the amplitude. When a position and a ratio of the first range and the second range are adjusted, a position and a length in the depth direction Z of the virtual image 70 are adjusted. Specifically, the vibration screen 46 vibrates at a frequency of 60 [Hz] or more, and when the image projection unit 45 projects different videos having a plurality of frames within the period 1/60 [see], the different videos (real images) having a plurality of frames are formed at respective vibration positions. That is, in the present embodiment, when a real image having a plurality of frames overlap in the vibration direction of the vibration screen 46, the first 3D real image 43 is generated. It is noted that the display control unit 30 may adjust the length in the depth direction Z of the virtual image 70 by changing the amplitude of the vibration screen 46.

The relay optical units 42 in FIG. 2 receive light of the first 3D real image 43 generated by the stereoscopic image display unit 41, form the second 3D real image 44 obtained by magnifying the first 3D real image 43 somewhere between the two relay optical units 42, and then, project the display light L which is light of the second 3D real image 44 toward the projection-receiving part 2. The relay optical units 42 include, for example, a first relay optical unit 47 including a group of lenses configured to receive the light of the first 3D real image 43 generated by the stereoscopic image display unit 41, a second relay optical unit 48 configured to reflect the light passing through the first relay optical unit 47 and cooperate with an optical power of the first relay optical unit 47 to form an image of the second 3D real image 44 obtained by magnifying the first 3D real image 43, and a third relay optical unit 49 configured to reflect the display light L which is the light of the second 3D real image 44, toward the projection-receiving part 2.

The first relay optical unit 47 has a function of magnifying each video formed at each vibration position of the vibration screen 46 in the first 3D real image 43, with a different magnification, and although a single lens is illustrated in FIG. 2 for simplicity, the first relay optical unit 47 is actually configured of a compound lens obtained by combining a plurality of thin film lenses not illustrated.

The second relay optical unit 48 includes, for example, a mirror having a concave reflection surface having a positive optical power, and receives the light of the first 3D real image 43 from the first relay optical unit 47, reflects the received light toward the third relay optical unit 49, and cooperates with the optical power of the first relay optical unit 47 to form an image of the second 3D real image 44 obtained by magnifying the first 3D real image 43 somewhere between the second relay optical unit 48 and the third relay optical unit 49. It is noted that the first relay optical unit 47 may include an optical operation provided by the second relay optical unit 48 to omit the second relay optical unit 48.

The third relay optical unit 49 is a concave mirror configured to reflect the display light L of the second 3D real image 44 toward the projection-receiving part 2, and has a function of correcting an image distortion caused by a curved shape of the projection-receiving part 2 and a function of magnifying the second 3D real image 44.

Thus, the configuration of the embodiment of the projection unit 40 configured to ensure that the 3D virtual image 70 is visually recognized is described, but the above is not limiting. Below, a modification of the projection unit 40 is described.

[Modification of Projection Unit 40]

In another embodiment in which a three-dimensional virtual image is visually recognized, the projection unit 40 may adopt the following schemes of: a parallax division scheme including a parallax barrier scheme and a lenticular lens scheme, a space reproduction scheme including a light field scheme and a hologram scheme, a transmittance adjustment screen scheme in which a plurality of screens having a light control layer whose transmittance can be adjusted are arranged in a stack in a thickness direction, a projector projects projection images, which are switched at high speed, toward the plurality of screens, and a 3D real image is displayed inside as a result of the plurality of screens appropriately adjusting respective dimming rates in response to a high-speed switching of the projection image, as disclosed in Japanese Patent Application Publication No. 2016-212318, and a scheme of displaying a 3D real image inside by overlapping a plurality of liquid crystal display elements in a thickness direction, as disclosed in Japanese Patent Application Publication No. 2004-168230. Thus, the configuration of the HUD device 10 according to the first to fourth embodiments of the present invention is described.

The first to fourth embodiments will be specifically described below with reference to FIG. 3 to FIG. 10.

First Embodiment

First, the description proceeds with reference to FIG. 3, and FIG. 4. FIG. 3 is a flowchart illustrating a main operation procedure of the HUD device 10 in the first embodiment, and FIG. 4 is a diagram illustrating a display example of the virtual images 73 and 74 corresponding to the flowchart of FIG. 3. FIG. 4(a) and FIG. 4(b) illustrate display examples before the virtual image 74 to be additionally displayed is displayed, and FIG. 4(c) and FIG. 4(d) illustrate display examples obtained after the display is updated in step S15 after step S13 in FIG. 3 is executed. FIG. 4(a) and FIG. 4(c) are diagrams each illustrating a foreground (another vehicle 100) and the virtual images 73 and 74 when the viewer looks ahead of the vehicle 1 (positive Z-axis direction), and FIG. 4(b) and FIG. 4(d) are diagrams each explaining a difference in display distance 80 between the virtual images 73 and 74.

In step S11 of FIG. 4, the display control unit 30 acquires new information (a vehicle speed of the other vehicle 100 indicated as "60 km/h" in FIG. 3(c)) via the information acquisition unit 20. The display control unit 30 regularly acquires various types of information and/or acquires the same immediately upon generation of the various types of information, via the information acquisition unit 20.

Subsequently, in step S12, the display addition determination unit 31 determines whether to additionally display the virtual image 70. The display addition determination unit 31 determines that a condition of adding the new virtual image 70 is satisfied if the acquired information is a predetermined type of information, if the acquired information is information that satisfies a predetermined condition, or if a predetermined combination is established among a plurality of pieces of acquired information, for example. In step S12, "if it is determined that the additional display is not performed (in a case of NO)", the process proceeds to step S14 where display data in which the information of the already displayed virtual image 73 is updated is generated, and the display is updated in step S15.

In step S12, "if it is determined that the additional display is performed (in a case of YES)", in step S13, the display distance determination unit 32 maintains the display distance 85 of the existing virtual image 73 already displayed and determines the display distance 86 of the virtual image 74 to be additionally displayed to be different from the display distance 85 of the existing virtual image 73. For example, as illustrated in FIG. 4(d), the display distance determination unit 32 determines the display distance 86 of the virtual image 74 to be additionally displayed without changing the display distance 85 of the existing virtual image 73 so that a display distance difference 87 is provided between the existing virtual image 73 and the virtual image 74 to be additionally displayed. Then, the display data generation unit 33 generates the display data to be visually recognized at the display distances 85 and 86 determined by the display distance determination unit 32 (step S14), and the display control unit 30 updates the display by driving the projection unit 40 based on the display data (step S15). At this time, the display distance determination unit 32 determines the display distance 86 of the virtual image 74 to be additionally displayed to be shorter than the display distance 85 of the existing virtual image 73, and thus, the additionally displayed virtual image 74 presenting the vehicle speed of the other vehicle 100 with an indication of "60 km/h" in FIG. 3(c) is visually recognized at a nearer side than the existing virtual image 73 emphasized by surrounding upper, lower, left, and right sides of a frame of the other vehicle 100. As a result, the virtual image 74 to be added is visually recognized on a nearer side than the existing virtual image 73, and thus, attention (stare) can be directed to the additionally displayed virtual image 74, and consequently, the information presented by the additionally displayed virtual image 74 is more easily recognized.

Second Embodiment

Next, the description proceeds with reference to FIG. 5 and FIG. 6. FIG. 5 is a flowchart illustrating a main operation procedure of the HUD device 10 according to the second embodiment, and FIG. 6(a) to FIG. 6(d) are diagrams each illustrating a display example of the virtual images 73 and 74 corresponding to the flowchart of FIG. 5. FIG. 6 (a) and FIG. 6 (b) illustrate display examples before the virtual image 74 to be additionally displayed is displayed, and FIG. 6(c) and FIG. 6(d) illustrate display examples obtained after the display is updated in step S25 after step S23 in FIG. 5 is executed. The second embodiment differs from the first embodiment in that the display distance 85 of the existing virtual image 73 is changed.

In step S21 of FIG. 5, the display control unit 30 acquires new information a (vehicle speed of the other vehicle 100 indicated as "60 km/h" in FIG. 6(c)) via the information acquisition unit 20. The display control unit 30 regularly acquires various types of information and/or acquires the same immediately upon generation of the various types of information, via the information acquisition unit 20.

Subsequently, in step S22, the display addition determination unit 31 determines whether to additionally display the virtual image 70. In step S22, "if it is determined that the additional display is not performed (in a case of NO)", the process proceeds to step S24 where display data in which the information of the already displayed virtual image 73 is updated is generated, and the display is updated in step S25.

In step S22, "if it is determined that the additional display is performed (in a case of YES)", in step S23, the display distance determination unit 32 changes the display distance 85 of the already displayed existing virtual image 73 to a display distance 85a, and determines the display distance 86 of the virtual image 74 to be additionally displayed to be different from the new display distance 85a of the existing virtual image 73. For example, as illustrated in FIG. 6(d), the display distance determination unit 32 determines the display distance 86 of the virtual image 74 to be additionally displayed while changing the display distance 85 of the existing virtual image 73 so that the display distance difference 87 is provided between the existing virtual image 73 and the virtual image 74 to be additionally displayed. Then, the display data generation unit 33 generates the display data to be visually recognized at the display distances 85 and 86 determined by the display distance determination unit 32 (step S24), and the display control unit 30 updates the display by driving the projection unit 40 based on the display data (step S25). At this time, the display distance determination unit 32 changes the display distance 85 to the display distance 85a obtained by lengthening the display distance 85 of the existing virtual image 73, and determines the display distance 86 of the virtual image 74 to be additionally displayed to be shorter than the display distance 85 of the existing virtual image 73. That is, in the second embodiment, as compared to the first embodiment in which the display distance 85 of the existing virtual image 73 is maintained, the display distance difference 87 between the existing virtual image 73 and the virtual image 74 to be additionally displayed is great, and thus, it is easier to distinguish between the existing virtual image 73 and the additionally displayed virtual image 74.

If the existing virtual image 73 and the virtual image 74 to be additionally displayed share the same target (the other vehicle in FIG. 6) 100 in a real scene to which the information is added, the virtual image 74 to be additionally displayed is visually recognized on a nearer side than a distal end on a viewer side of the other vehicle 100 (a rear-surface body of the other vehicle) and the existing virtual image 73 is visually recognized on a farther side (in the positive Z-axis direction) from a position of ½ in the depth direction (Z-axis direction) of the other vehicle 100. As a result, from the virtual image 74 to be additionally displayed, which is visually recognized on a nearer side as viewed from the viewer, toward the existing virtual image 73 visually recognized on a farther side, it is increasingly difficult to direct the visual attention in the order of the virtual image 74 to be additionally displayed, the other vehicle 100, and the existing virtual image 73. Therefore, even if the viewer's visual attention is directed at the other vehicle 100 in the real view to which the greatest attention should be drawn, it is more difficult to direct the visual attention to the existing virtual image 73 visually recognized on a farther side than the distal end on the viewer's side of the other vehicle 100, and it is easier to direct the visual attention to the additionally displayed virtual image 74 on a nearer side than the distal end on the viewer's side of the other vehicle 100. It is easy for the viewer to quickly distinguish between the existing virtual image 74 and the additionally displayed virtual image 73, and to recognize the information presented by the additionally displayed virtual image 73. It is noted that the display control unit 30 preferably controls so that the virtual image 74 to be additionally displayed is visually recognized on a nearer side than a distal end on a viewer side of the other vehicle 100 (rear-surface body of the other vehicle) and the existing virtual image 73 is visually recognized on a farther side (in the positive Z-axis direction) from the distal end in the depth direction of the other vehicle 100. As a result, it is easier to distinguish between the additionally displayed virtual image 74 and the existing virtual image 73.

Third Embodiment

Next, the description proceeds with reference FIG. 7 and FIG. 8. FIG. 7 is a flowchart illustrating a main operation procedure of the HUD device 10 according to the third embodiment, and FIG. 8(a) to FIG. 8(f) are diagrams each illustrating a display example of the virtual images 73 and 74 corresponding to the flowchart of FIG. 7. FIG. 8(a) and FIG. 8(b) illustrate a display example before the virtual image 74 to be additionally displayed is displayed, FIG. 8(c) and FIG. 8(d) illustrate a display example after the display is updated in step S37 after step S33 in FIG. 7 is executed, and FIG. 8(e) and FIG. 8(f) illustrate a display example after the display is updated in step S37 after step S35 in FIG. 7 is executed. The third embodiment differs from the first and second embodiments in that if the condition satisfaction determination unit 34 determines that a specific condition is established, a process of shortening the display distance difference 87 between the additionally displayed virtual image 74 and the existing virtual image 73 is provided (steps S34 and S35 described later).

In step S31 of FIG. 7, the display control unit 30 acquires new information (a vehicle speed of the other vehicle 100 indicated as "60 km/h" in FIG. 8(c)) via the information acquisition unit 20.

Subsequently, in step S32, the display addition determination unit 31 determines whether to additionally display the virtual image 70. In step S32, "if it is determined that the additional display is not performed (in a case of NO)", the process proceeds to step S34 without executing step S33. Processes in and after step S34 will be described later.

In step S32, "if it is determined the additional display is performed (in a case of YES)", in step S33, the display distance determination unit 32 maintains the display distance 85 of the existing virtual image 73 already displayed and determines the display distance 86 of the virtual image 74 to be additionally displayed as a display distance to be different from the display distance 85 of the existing virtual image 73. For example, as illustrated in FIG. 8(d), the display distance determination unit 32 determines the display distance 86 of the virtual image 74 to be additionally displayed without changing the display distance 85 of the existing virtual image 73 so that a display distance difference 87 is provided between the existing virtual image 73 and the virtual image 74 to be additionally displayed. Then, the display data generation unit 33 generates the display data to be visually recognized at the display distances 85 and 86 determined by the display distance determination unit 32 (step S36), and the display control unit 30 updates the display by driving the projection unit 40 based on the display data (step S37).

Unique steps S34 and S35 in the third embodiment will be described.

In step S34, after the virtual image 74 is additionally displayed, the condition satisfaction determination unit 34 determines whether a specific condition is established, and if a predetermined time period or more passes after the virtual image 74 is additionally displayed, for example, determines that the specific condition is established. In step S34, "if it is determined that the predetermined time period or more has not passed (in a case of NO)", the process proceeds to step S36 without executing step S35.

In step S34, "if it is determined that the predetermined time period or more has passed (in a case of YES)", the display distance determination unit 32 shortens the display distance difference 87 between the additionally displayed virtual image 74 and the existing virtual image 73 in step S35. For example, the display distance determination unit 32 brings the additionally displayed virtual image 74 close to the existing virtual image 73 (changes from the display distance 86 in FIG. 8(d) to a display distance 86a in FIG. 8(f)) without changing the display distance 85 of the existing virtual image 73. Then, the display data generation unit 33 generates the display data to be visually recognized at the display distances 85 and 86 determined by the display distance determination unit 32 (step S36), and the display control unit 30 updates the display by driving the projection unit 40 based on the display data (step S37). It is noted that as another method, the display distance determination unit 32 may bring the display distance 85 of the existing virtual image 73 close to the additionally displayed virtual image 74 without changing the display distance 86 of the additionally displayed virtual image 74, or may shorten the display distance difference 87 by changing both the display distance 85 of the existing virtual image 73 and the display distance 86 of the additionally displayed virtual image 74. Thus, the display distance difference 87 between the existing virtual image 73 and the virtual image 74 to be additionally displayed is shortened, and therefore, as compared to a case where the display distance difference 87 is long, readability of the other virtual image (display) is improved when one of the virtual images (displays) is in focus, and it is easy to simultaneously or quickly recognize the information presented by the both virtual images.

It is noted that in FIG. 8(f), even after step S37 is executed in FIG. 7, the display distance difference 87 is provided between the additionally displayed virtual image 74 and the existing virtual image 73; however, the display distance difference 87 may not be provided. In other words, in step S34, "if it is determined that the predetermined time period or more has passed (in a case of YES)", the display distance determination unit 32 may eliminate the display distance difference 87 between the additionally displayed virtual image 74 and the existing virtual image 73, in step S35. In other words, the display distance 86 of the additionally displayed virtual image 74 and the display distance 85 of the existing virtual image 73 may be the same.

Fourth Embodiment

Next, the description proceeds with reference FIG. 9 and FIG. 10. FIG. 9 is a flowchart illustrating a main operation procedure of the HUD device 10 according to the fourth embodiment, and FIG. 10(a) to FIG. 10(f) are diagrams each illustrating a display example of the virtual images 73 and 74 corresponding to the flowchart of FIG. 9. FIG. 10(a) and FIG. 10(b) illustrate a display example before the virtual image 74 is additionally displayed, FIG. 10(c) and FIG. 10(d) illustrate a display example after the virtual image 74 is additionally displayed, and FIG. 10(e) and FIG. 10(f) illustrate a display example after the display is updated in step S47 after step S45 in FIG. 9 is executed. In the fourth embodiment, there is a process of changing the display distance 85a of the remaining existing virtual image 73 to the display distance 85 at which the existing virtual image 73 is originally displayed (steps S44 and S45 described later) if the condition satisfaction determination unit 34 determines that a specific condition for hiding the virtual image 74 to be additionally displayed is satisfied.

In step S41 of FIG. 9, the display control unit 30 acquires new information (a vehicle speed of the other vehicle 100 indicated as "60 km/h" in FIG. 10(c)) via the information acquisition unit 20.

Subsequently, in step S42, the display addition determination unit 31 determines whether to additionally display the virtual image 70. In step S42, "if it is determined that the additional display is not performed (in a case of NO)", the process proceeds to step S44 without executing step S43. Processes in and after step S44 will be described later.

In step S42, "if it is determined that the additional display is performed (in a case of YES)", in step S43, the display distance determination unit 32, in step S43, the display distance determination unit 32 changes the display distance 85 of the already displayed existing virtual image 73 to the display distance 85a, and determines the display distance 86 of the virtual image 74 to be additionally displayed to be a display distance different from the new display distance 85a of the existing virtual image 73. For example, as illustrated in FIG. 6(d), the display distance determination unit 32 determines the display distance 86 of the virtual image 74 to be additionally displayed while changing the display distance 85 of the existing virtual image 73 so that the display distance difference 87 is provided between the existing virtual image 73 and the virtual image 74 to be additionally displayed. Then, the display data generation unit 33 generates the display data to be visually recognized at the display distances 85 and 86 determined by the display distance determination unit 32 (step S46), and the display control unit 30 updates the display by driving the projection unit 40 based on the display data (step S47).

Unique steps S44 and S45 in the fourth embodiment will be described.

In step S44, the condition satisfaction determination unit 34 determines whether a specific condition for hiding the additionally displayed virtual image 74 is satisfied after the virtual image 74 is additionally displayed, and for example, the condition satisfaction determination unit 34 determines that specific condition is established if a predetermined time period or more passes after the virtual image 74 is additionally displayed. In step S44, "if the specific condition is not satisfied (in a case of NO)" the process proceeds to step S46 without executing step S45.

In step S44 "if the specific condition is established (in a case of YES)", in step S45, the display distance determination unit 32 changes the display distance 85a of the remaining existing virtual image 73 to the display distance 85 at which the existing virtual image 73 is originally displayed (restores from the display distance 85a of FIG. 10(d) to the display distance 85 of FIG. 10(f). Then, the display data generation unit 33 generates the display data so that the virtual image 73 is visually recognized at the display distance 85 determined by the display distance determination unit 32 or the virtual image 74 is hidden (step S46), and the display control unit 30 updates the display by driving the projection unit 40 based on the display data (step S47). In this display update, the virtual image 74 is hidden and the virtual image 73 is displayed at the display distance 85.

It is noted that as a modification of the fourth embodiment, if the condition satisfaction determination unit 34 determines that the specific condition for hiding the already displayed virtual image 73 is established after the virtual image 74 is additionally displayed, the display distance 86 of the remaining additionally displayed virtual image 73 may be set to the display distance 85 at which the existing virtual image 73 is originally displayed. FIG. 11(a) to FIG. 11(d) are diagrams each illustrating a display example of the virtual images 73 and 74 in the modification of the fourth embodiment. FIG. 11(a) and FIG. 11(b) illustrate a display example before the virtual image 74 is additionally displayed, FIG. 11(c) and FIG. 11(d) illustrate a display example after the virtual image 74 is additionally displayed, and FIG. 11(e) and FIG. 11(f) illustrate a display example after the display is updated in step S45 after step S45 in FIG. 9 is executed. In step S44, "if the specific condition is established (in a case of YES)", in step S45, the display distance determination unit 32 sets the display distance 86 of the remaining virtual image 74 to be additionally displayed to the display distance 85 at which the existing virtual image 73 is originally displayed (changes from the display distance 86 of FIG. 11(d) to the display distance 85 of FIG. 11(f)). Then, the display data generation unit 33 generates the display data so that the virtual image 74 is visually recognized at the display distance 85 determined by the display distance determination unit 32 and the virtual image 75 is hidden (step S46), and the display control unit 30 updates the display by driving the projection unit 40 based on the display data (step S47). In this display update, the virtual image 73 is hidden and the virtual image 74 is displayed at the display distance 85.

[Modifications]

It is noted that the present invention is not limited in any way to the above embodiments and the drawings. Modifications (including deletion of constituent elements) may be appropriately added to the embodiments and the drawings as long as the gist of the present invention is not changed. Below, an example of the modifications is described.

In the above embodiments, the specific condition determined by the condition satisfaction determination unit 34 is that the time period during which the display is continued is longer than the predetermined time period, but this is not limiting. For example, the specific condition determined by the condition satisfaction determination unit 34 may be that a specific type of information is input via the information acquisition unit 20 or conversely, the specific type of information is not input. Further, the specific condition may be that the information input via the information acquisition unit 20 may satisfy a condition such as a predetermined threshold value being reached. Alternatively, the specific condition may be that a plurality of pieces of information to be input via the information acquisition unit 20 satisfy a specific combination.

INDUSTRIAL APPLICABILITY

A head-up display device of the present invention is applicable as a virtual image display device mounted on a moving body such as a vehicle.

DESCRIPTION OF REFERENCE NUMERALS

1 Vehicle
2 Projection-receiving part
3 Viewpoint
4 Eye box
5 Communication interface
10 HUD device (head-up display device)
20 Information acquisition unit
30 Display control unit
31 Display addition determination unit
32 Display distance determination unit
33 Display data generation unit
34 Condition establishment determination unit
40 Projection unit
41 Stereoscopic image display unit
42 Relay optical unit
43 First 3D real image
44 Second 3D real image
45 Image projection unit
46 Vibration screen
70 Virtual image
80 Display distance
87 Display distance difference
100 Target (another vehicle)
L Display light

The invention claimed is:

1. A head-up display device comprising:
a projection unit configured to project, towards a projection-receiving part, display light for displaying one or more virtual images in respective positions having different display distances from a viewer;
an information acquisition unit configured to acquire information from outside;
a display addition determination unit configured to determine, based on the information acquired by the information acquisition unit, whether to display an additional virtual image in addition to an already-displayed existing virtual image; and
a display distance determination unit configured to adjust the display distances of the one or more virtual images displayed by the projection unit, wherein when the display addition determination unit determines that the additional virtual image is to be displayed, the display distance determination unit 1) determines a display distance of the already-displayed existing virtual image and 2) determines a display distance of the additional virtual image based on the display distance of the already-displayed existing virtual image such that the display distance of the additional virtual image is shorter than the display distance of the already-displayed existing virtual image, wherein, when a predetermined time period or more elapses after the additional virtual image is additionally displayed, the display distance determination unit shortens a display distance difference between the additionally displayed additional virtual image and the already-displayed existing virtual image.

2. The head-up display device according to claim 1, wherein when the display addition determination unit determines that the additional virtual image is to be displayed, the display distance determination unit changes the display distance of the already-displayed existing virtual image to a different display distance and determines the display distance of the additional virtual image to be different from the display distance of the already-displayed existing virtual image.

3. The head-up display device according to claim 2, wherein when the display addition determination unit determines that the additional virtual image is to be displayed, the display distance determination unit changes the display distance of the already-displayed existing virtual image to the different display distance and determines the display distance of the additional virtual image to be a same display distance as the display distance of the already-displayed existing virtual image before being changed.

4. The head-up display device according to claim 1, wherein when the display addition determination unit determines that the additional virtual image is to be displayed, the display distance determination unit changes the display distance of the already-displayed existing virtual image to a different display distance and determines the display distance of the additional virtual image to be a same distance as the display distance of the already-displayed existing virtual image before being changed.

5. The head-up display device according to claim 1, wherein shortening the display distance difference between the additionally displayed additional virtual image and the already-displayed existing virtual image includes the display distance determination unit equalizing the display distance of the additionally displayed additional virtual image and the display distance of the already-displayed existing virtual image.

6. The head-up display device according to claim 5, wherein shortening the display distance difference between the additionally displayed additional virtual image and the already-displayed existing virtual image includes the display distance determination unit adjusting the display distance of the already-displayed existing virtual image close to the display distance of the additionally displayed additional virtual image.

7. The head-up display device according to claim 1, wherein shortening the display distance difference between the additionally displayed additional virtual image and the already-displayed existing virtual image includes the display distance determination unit adjusting the display distance of the already-displayed existing virtual image close to the display distance of the additionally displayed additional virtual image.

8. The head-up display device according to claim 1, wherein shortening the display distance difference between the additionally displayed additional virtual image and the already-displayed existing virtual image includes the display distance determination unit adjusting the display distance of the additionally displayed additional virtual image close to the display distance of the already-displayed existing virtual image.

* * * * *